July 21, 1942.   E. M. IRWIN   2,290,330
METHOD OF AND APPARATUS FOR TESTING PROPERTIES OF MATERIALS
Filed Aug. 12, 1940   3 Sheets-Sheet 1
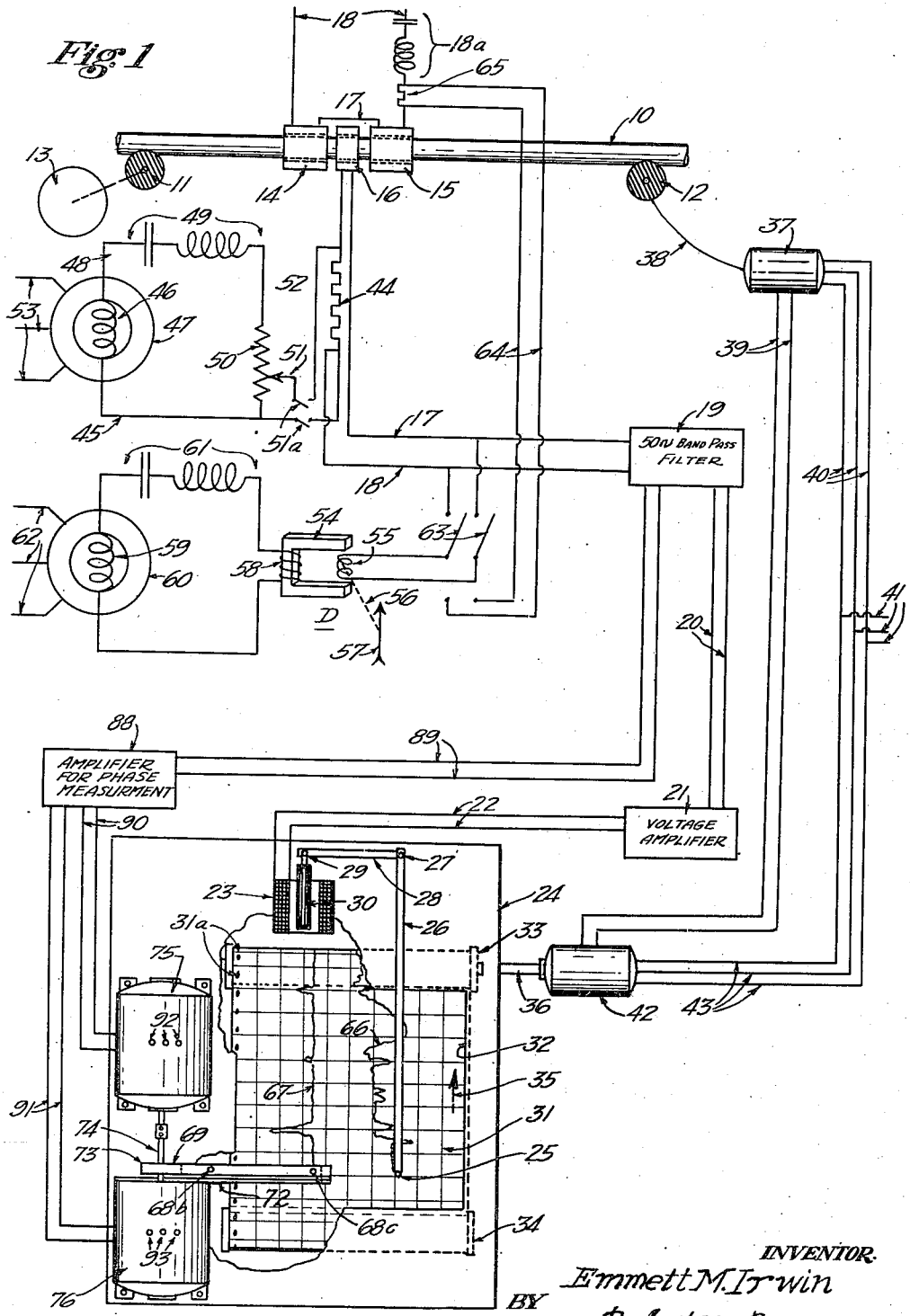
INVENTOR.
Emmett M. Irwin
BY Robert M. Bruce
ATTORNEY.

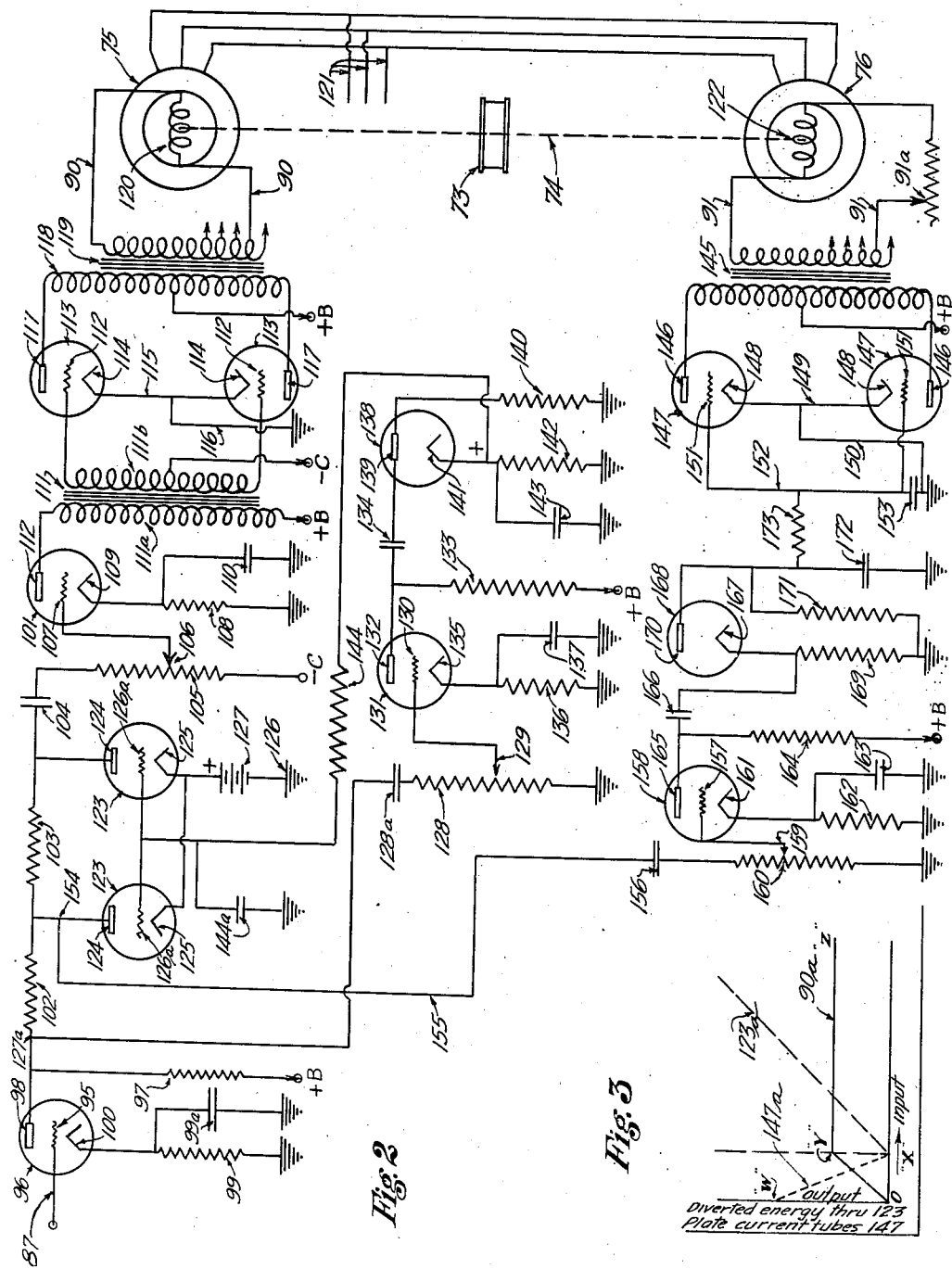

July 21, 1942.  E. M. IRWIN  2,290,330
METHOD OF AND APPARATUS FOR TESTING PROPERTIES OF MATERIALS
Filed Aug. 12, 1940   3 Sheets-Sheet 3
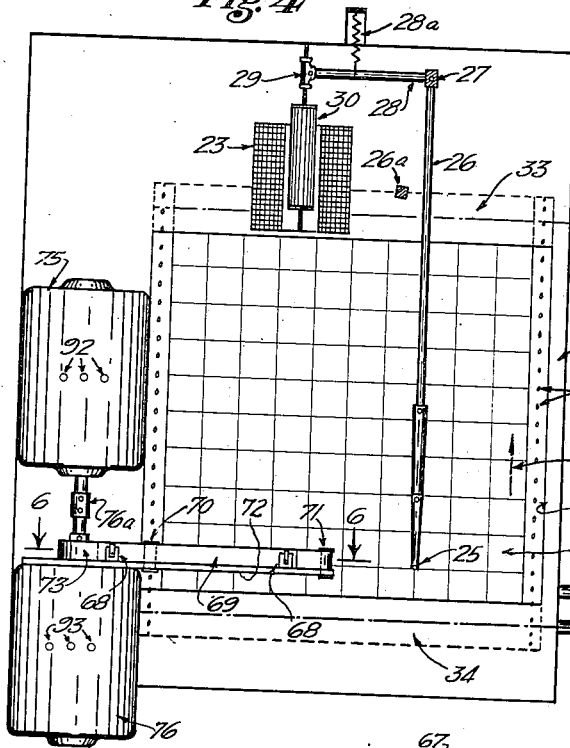
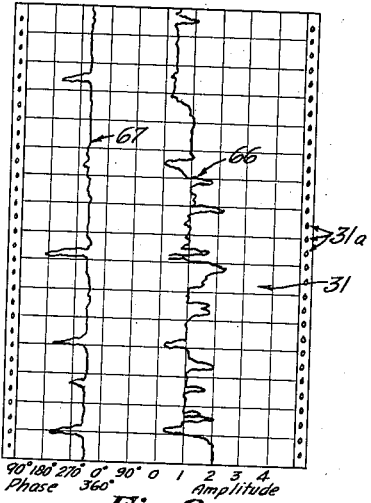
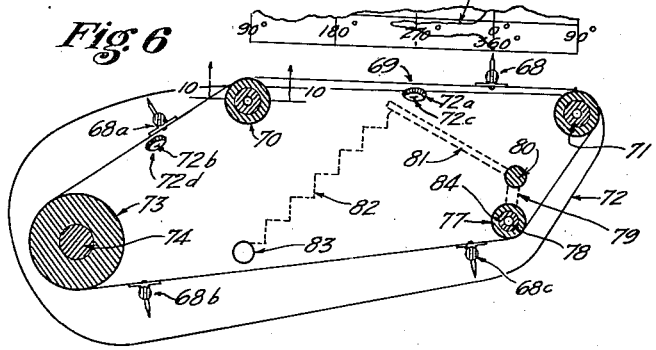
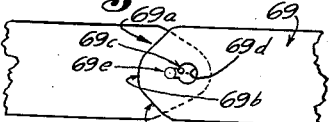
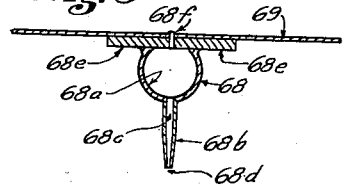
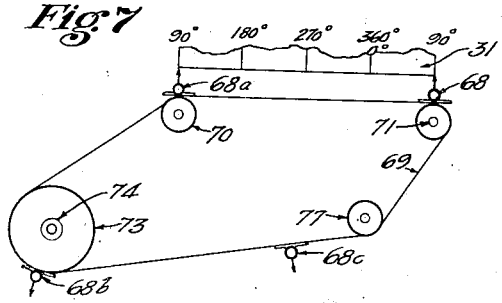
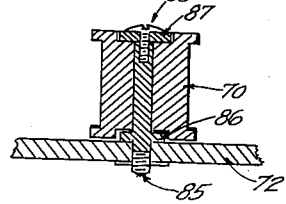
INVENTOR.
Emmett M. Irwin
BY Robert M. Bruce
ATTORNEY.

Patented July 21, 1942

2,290,330

UNITED STATES PATENT OFFICE 2,290,330

METHOD OF AND APPARATUS FOR TESTING PROPERTIES OF MATERIALS

Emmett M. Irwin, Long Beach, Calif., assignor to Magnetest Corporation, Long Beach, Calif., a corporation of California Application August 12, 1940, Serial No. 352,280

25 Claims. (Cl. 175—183)

My invention relates to a method and apparatus for testing the properties of materials.

It has been proposed, heretofore, to test the properties of materials, such as magnetic materials for example, by utilizing the material to be tested to affect a circuit excited by an alternating current, and observing the effect of the material upon the electrical characteristics of the alternating current circuit or electrically related circuit, to determine the presence of defects or the physical properties of the material. In this manner materials have been tested to determine defects in the material such as cracks, surface irregularities, internal flaws, blowholes, pipes resulting from inclusions of slag in rolling down the material from an ingot, and also to determine the effect of heat treatment, hardness, chemical composition, and magnetic properties. These tests generally have been made by referring the observed magnitudes to a known standard by comparing the effect on the alternating current circuit of a standard specimen of known properties with the effect of a specimen of unknown properties to be tested, or by simultaneous effects of the standard and the specimen to be tested on related alternating current circuits.

Unless the phase relation of the voltage and the current in the alternating current circuit affected by the material is determined, the results observed in these tests may be very misleading. A small magnitude of voltage or current may be indicated, when in fact the magnitude is large, because the measurement of the magnitude may be made in such phase relation as to give only a small magnitude, which is merely a component part of the true larger magnitude. Furthermore, there is a relationship between the phase angle of the voltage and the current in the alternating current circuit and the properties of the material being tested, so that one may measure the magnitude of an electrical characteristic of the alternating current circuit with the impression that the magnitude represents a condition or property of the material, whereas in fact if the phase relation were known it would indicate that the magnitude represented a different property than the one under consideration.

In some tests of this kind determinations have been made of the phase relation between the voltage and the current in an alternating current circuit affected by the material tested. However, the determinations have been made by constructing the phase relation from observed data. By this procedure it is difficult to accurately relate the measurements of phase angle and amplitude, which results in erroneous observations. Furthermore this procedure is almost impossible to carry out effectively if the material being tested is being moved with respect to the alternating current circuit, as is required in testing rods, pipes, or other long pieces of material, because the changes in phase ordinarily would occur too rapidly to permit such observations. The failure to observe these rapid phase changes has lead to erroneous results.

An object of my invention is to provide an improved and more reliable method and apparatus for testing materials in which the material affects an electrical characteristic of an alternating current circuit. I accomplish this by indicating a magnitude functionally related to the phase angle between an alternating current and an alternating voltage in a circuit affected by the material, and indicating a magnitude functionally related to an alternating electrical characteristic of the circuit in timed relation to or simultaneously with and independently of indicating the magnitude related to the phase angle. In this manner all indications are related to the phase relations in the alternating current circuit, which provides for greatly increased accuracy of results and facilitates more rapid testing of the material.

Another object of my invention is to provide in a testing system in which a material to be tested is moved with respect to an alternating current circuit, an improved method and apparatus to minimize the occurrence of erroneous observations. I accomplish this by providing a circuit excited by an alternating current source of supply, moving the material to be tested with respect to the alternating current circuit, and co-ordinating the observations of a voltage or other electrical characteristic of the alternating current circuit affected by the material and the phase relation between the voltage and the current in the alternating current circuit, in timed relation to the movement of the material being tested.

Another object of my invention is to provide an improved arrangement for indicating or recording a magnitude functionally related to the phase angle between the voltage and the current in the alternating current circuit affected by the material to be tested. I accomplish this by providing an amplifier without variable phase distortion for amplifying the relatively feeble voltage or current observed in the alternating current circuit and indicating or recording the output from the amplifier in terms of phase angle.

Further objects and advantages of my invention will become apparent as the following description proceeds, and the features of novelty which characterize my invention will be pointed out with particularity in the claims annexed to and forming a part of this specification.

In the drawings, Fig. 1 is a schematic diagram of an apparatus embodying the constructional features of my invention, and adapted to the carrying out of my improved method; Fig. 2 is a diagrammatic illustration of the electron discharge circuits employed in connection with my improved phase recorder; Fig. 3 is a diagram illustrating certain electrical characteristics of the circuits shown in Fig. 2; Fig. 4 is a front elevation of my improved phase recorder and amplitude recorder; Fig. 5 is a front view of a portion of a record sheet or chart obtained in the operation of the recorder shown in Fig. 4; Fig. 6 is a sectional view on the line of 6—6 of Fig. 4; Fig. 7 is a diagrammatic view of the construction shown in Fig. 6 illustrating how one of the styluses is moved out of recording position with respect to the record sheet when the other stylus is moved into recording position with respect thereto; Fig. 8 is a detail view of the joint between the ends of the steel ribbon which I preferably employ as the endless band of the recorder on which the styluses are mounted; Fig. 9 is an enlarged cross sectional view of one of the styluses or pens employed on the band of the phase recorder; and Fig. 10 is an enlarged sectional view on the line 10—10 of Fig. 6, showing the manner of mounting the rollers for supporting the band.

Referring to the drawings, in Fig. 1 I have shown schematically an entire system embodying the novel constructional features of my invention, and also a system adaptable to carrying out my improved method. A specimen 10 of magnetizable material, such as a sucker rod from an oil well, a drill pipe used in drilling oil wells, or other suitable bar, is supported on rollers 11 and 12, so as to be movable longitudinally. In order to move the specimen 10 as desired, it may be moved on the rollers by hand, or by a driving motor 13, which keeps the specimen 10 within the desired range of speed of movement. The specimen 10 is moved coaxially through primary windings 14 and 15 arranged on opposite sides of a secondary winding 16. The windings 14 and 15 are wound in the same direction, so as to give an additive effect to their ampere turns. The windings 14, 15, and 16 are supported in coaxial relation with the specimen 10 in any suitable manner, and provide for free movement of the specimen through the coils. The windings 14 and 15 are connected in series at 17 and across an alternating current source of supply 18. I have found it to be satisfactory to utilize the alternating current source of supply 18 at fifty cycle frequency, and a current filter 18a is provided in the circuit to pass to the coils 14 and 15 only a pure sine wave current of fifty cycle frequency. The secondary winding 16 is preferably placed in the center of the space between the windings 14 and 15. The secondary winding 16 is connected by conductors 17 and 18 to a fifty cycle band pass filter 19, passing any frequency, which it is desired to study as modified by the changes in the characteristics of the specimen 10. The band pass filter 19 is connected by conductors 20 to a voltage amplifier 21. The voltage amplifier 21, if desired, may be a current amplifier, so long as the output therefrom through conductors 22 as the output solenoid 23 of a recorder 24 is to a stationary solenoid 23 of a recorder 24 is a function of an electrical characteristic of the secondary circuit associated with the secondary coil 16.

The construction of the recorder 24 is clearly shown in Figs. 1, 4, 6, 7, 8, 9, and 10. In order to record an amplitude functionally related to an electrical characteristic of the secondary circuit associated with the secondary coil 16, the recorder 24 is provided with a stylus or pen 25 mounted on the lower end of arm 26, which is pivotally supported on the body of the recorder at 27. The horizontal arm 28 is rigidly attached to the vertical arm 26 of the recorder, and the outer end of the arm 28 is pivotally connected at 29 to a soft iron armature 30 suspended within the stationary solenoid 23. The arms 26 and 28 are balanced by a spring 28a, and a stop 26a limits the range of movement of the arm 26. A record of the magnitude to be indicated by the stylus 25 on the record member or chart 31 is obtained by maintaining the record sheet in a stretched condition in cooperative relation with the stylus 25 and close to the opening 32 in the front of the recorder. I provide an upper roller 33 upon which the record sheet is wound, and a lower roller 34 from which the record sheet is wound, the rollers 33 and 34 being supported in suitable bearings. The edges of the record sheet preferably are perforated at 31a along the edges to prevent slipping by engagement with suitable teeth associated with the rollers 33 and 34. The rollers 33 and 34 are geared together by an arrangement including a slip clutch or belt, so that upon driving the rollers 33 and 34 to move the record sheet as indicated by the arrow 35, the record sheet is maintained in a taut condition. I have found it convenient to make the scale of the record sheet, or chart, so that one-tenth of an inch of movement of the chart indicates one foot of movement of the specimen 10. The roller 33 is, therefore, connected to a driving shaft 36 through suitable reduction gearing.

The shaft 36 is driven in timed relation to the movement of the specimen 10 by connecting the roller 12 to the rotatable element of a dynamo-electric machine or self synchronous motor 37 by a flexible shaft 38. The shaft 38 is connected to the rotatable element of the dynamo-electric machine 37, which is provided with a two pole concentrated winding, the winding being connected through suitable brushes to conductors 39. The dynamo-electric machine 37 also has a three phase distributed winding which is connected to a three phase alternating current source of supply 41.

The conductors 39 are connected to the winding of a rotatable member of a dynamo-electric machine or self synchronous motor 42, which is like the dynamo-electric machine 37. This rotatable member has a two pole concentrated winding connected with the conductors 39 by suitable brushes. The stationary member of the dynamo-electric machine 42 has a three phase distributed type winding connected by the conductors 43 to the three phase alternating current source of supply 41. By this arrangement of the dynamo-electric machines 37 and 42, movement of the specimen 10 is transmitted through the roller 12 flexible shaft 38 and machines 37 and 42 to the shaft 36, and the chart 31 is moved as indicated by the arrow 35 in the desired timed relation to the movement of the test specimen 10.

In order to obtain the most sensitive relationship between the specimen 10 to be tested and the secondary coil, I prefer to introduce a balancing wave in the secondary circuit associated with the coil 16. This balancing wave, or opposing electrical characteristic, is in the present arrangement fifty-cycle pure sine wave, so as to be the same as the alternating current source of supply 18 exciting the coils 14 and 15. The balancing wave should balance out the component of the frequency of the fundamental or harmonic, which it is desired to study as affected by the specimen 10. This balancing wave may be equal and opposed to an electrical characteristic of the secondary circuit of the coil 1, such as the voltage, or it may be made slightly less for convenience in obtaining a reference for measurement and comparison.

This balancing wave is introduced into the circuit by providing a non-inductive resistor 44 in series with the secondary circuit connected across the coil 16. The lower terminal of the non-inductive resistor 44 is connected through suitable brushes and conductor 45 to the adjustable secondary concentrated two pole winding 46 of a phase shifting transformer 47. The other terminal of the winding 46 is connected by a conductor 48, a filter 49, a variable resistor 50, a slider 51, and conductor 52, to the upper end of the non-inductive resistor 44. The filter 49 prevents the passage of all electrical characteristics above fifty-cycles from the winding 46 to the resistor 44. The filters 49 and 19 should be changed in accordance with the component of frequency required in the particular test. A switch 51a is provided to connect and disconnect the winding 46 from the resistor 44, as desired. The phase shifting transformer 47 is provided with a three phase distributed winding, which is connected at 53 to a three phase alternating current source of supply, the frequency of the source of supply of 53 being fifty cycles to correspond with the frequency of the alternating current source of supply 18, or other frequency relating the particular characteristic of the specimen 10 being investigated. Any suitable manual arrangement is provided for adjusting the position of the concentrated winding 46 on the rotatable member of the phase shifting transformer 47, a scale being provided to indicate three hundred and sixty electrical degrees corresponding to one complete revolution of the rotatable member 46. This arrangement provides for interposing into the secondary circuit associated with the coil 16 a single phase pure sine wave alternating current of fifty cycle frequency, the phase relation of which can be varied as desired by the rotation of a rotatable member 46, and the magnitude of which can be varied by an adjustment of the slider 51 on the variable resistor 50.

Delicate measurements of the relations of the voltage, or other electrical characteristic, in the secondary circuit associated with the coil 16, may be made by a dynamometer D having a field core 54 and a two pole concentrated winding or armature 55 mounted on a suitable core and rotatably supported adjacent the end of the field core 54. The armature core and winding 55 are connected at 56 to an indicating hand 57, which in the de-energized condition of the dynamometer remains in a zero position, but may move in either direction to indicate the voltages in opposite directions. The field core 54 of the dynamometer is provided with a field exciting winding 58. This field exciting winding 58 is connected across a concentrated two pole winding 59 of a phase shifting transformer 60 through suitable brushes to provide for rotation of the rotatable member carrying the winding 59. A filter 61 is arranged in the circuit to filter out all frequencies above fifty cycles, so that the field exciting winding 58 of the dynamometer is excited by a single phase fifty cycle pure sine wave alternating source of supply. The stationary member of the dynamo-electric machine 60 is provided with a three phase distributed winding connected to an alternating current source of supply 62, which is in the present arrangement fifty cycles but should correspond to the frequency of the balancing wave. The rotatable member of the dynamo-electric machine 60 is also provided with a dial indicating three hundred and sixty electrical degrees for one complete revolution. By rotation of the rotatable member carrying the winding 59 the phase relation of the voltage and the current supplied to the field exciting winding 58 of the dynamometer D can be varied as desired. The movable coil or armature of the dynamometer is connected to the poles 63 of a two pole two position switch, shown in its open position. When the poles 63 of the switch are closed in their upper position the armature 55 is connected across the conductors 17 and 18, so as to be connected across the secondary circuit associated with the coil 16. In their lower closed position the poles 63 of the switch connect the armature 55 of the dynamometer, through conductors 64, across a non-inductive resistor 65, which is connected in series with the terminal of the winding 15 connected to the alternating current source of supply 18.

For convenience in measurement, I prefer to relate the phase relation of an electrical characteristic of the secondary circuit, and an electrical characteristic of the balancing wave introduced into the secondary circuit by the phase shifting transformer 47 through the resistor 44, to the current in the alternating current source of supply 18. I do this by closing the poles 63 of the switch to their lower position to connect the armature 55 of the dynamometer D across the resistor 65. The position of the rotatable member 59 of the phase shifting transformer 60 is then adjusted until the dynamometer indicator 57 reads zero, and the angular position of the rotatable member 57 is noted. This indicates that the single phase in the field exciting winding 58 of the dynamometer is in quadrature phase relation to the alternating current source of supply 18. I then close the poles 63 of the two position switch in their upper position to connect the armature 55 of the dynamometer D across the secondary circuit 17 and 18. The rotatable member 59 of the phase shifting transformer 60 is then adjusted until the dynamometer reads zero. This indicates that the fifty cycle voltage supplied from the rotatably adjustable winding 59 is in quadrature phase relation to the voltage of the secondary circuit connected to the secondary coil 16. The phase shifting transformer 47 is now put in circuit by closing the switch 51a and the rotatable member 46 is also adjusted until the dynamometer D reads zero, which indicates that the single phase fifty cycle voltage supplied from the winding 46 is also in quadrature with the voltage in the secondary circuit 17 and 18. The voltage of the balancing wave introduced at 44 now may be in phase with the voltage and current in the secondary circuit 17 and 18, or one hundred and eighty degrees out of phase. If the voltage of the balancing wave introduced at 44 is in opposition to the secondary voltage, the dynamometer D may be adjusted to zero. If it is found that the voltage of the balancing wave introduced at 44 and the secondary voltage are not in opposition, it will be necessary merely to rotate the adjustable winding 46 one hundred and eighty electrical degrees and then adjust dynamometer D to zero. In measuring the characteristics of some materials having very widely varying characteristics it may be desirable not to balance the voltage in the secondary circuit 17 and 18 to zero with the balancing wave interposed at 44, but provide for a slight unbalance by making the balancing wave slightly less than the voltage in the secondary circuit.

After the balancing wave is introduced through the resistor 44 into the secondary circuit associated with the coil 16, as above described, the specimen 10 is moved through the coils 14, 15, and 16. The variations in the properties of the specimen 10 will affect the amplitude and phase in the secondary circuit in accordance with the characteristics of the material, and the magnitude of the relative changes will be indicated by the stylus or pen 25 which is controlled by the solenoid 23, receiving energy from the secondary circuit through the filter 19. The chart or record sheet 31 will be moved by the dynamo-electric machines 37 and 42, in accordance with the movement of the specimen 10, as indicated by the arrow 35 in Fig. 1. This will cause the stylus 25 to trace a curve 66 on the record sheet. Unless the phase relation of the voltage and current in the alternating current circuit affected by the specimen 10 is determined, it is impossible to correctly interpret the significance of the magnitude changes indicated at 66 on the record sheet, which are magnitudes functionally related to the voltage or electrical characteristic of the alternating current circuit affected by the specimen. I, therefore, provide an arrangement for independently and simultaneously indicating or recording a magnitude functionally related to the phase relation between the alternating voltage and the alternating current in the alternating current circuit associated with the coil 16, which are affected in magnitude and phase by the specimen 10 excited from the alternating current source of supply 18. The balancing wave thus provides an increment of an electrical characteristic or voltage in the secondary circuit indicative of the condition or property of the material being tested. I preferably provide an automatic arrangement for indicating or recording a magnitude functionally related to an electrical characteristic or voltage derived from the secondary circuit affected by the material being tested, and also for indicating or recording a magnitude functionally related to the phase angle between this electrical characteristic or voltage in the secondary circuit affected by the material being tested and a suitable reference such as the current in the primary coil exciting circuit of the testing system.

This indication of phase angle is preferably recorded separately from the indication of magnitude shown by the curve 66, but is recorded in timed relation to the indication of magnitude given by the curve 66, and in timed relation to the movement of the specimen 10. The phase relations are, therefore, preferably recorded at 67 on the record sheet 31 with ordinates extending horizontally, so that every magnitude variation of the curve 66 is coordinated in relation to the magnitude related to the phase relations indicated by the curve 67. Such a record sheet is shown in Fig. 5. The curve 67 is traced on the record sheet 31 by a stylus or pen 68, as clearly shown in Fig. 6. The stylus 68 is mounted on its endless band 69, which is supported in front of the record sheet 31 in the form of an elongated loop by a plurality of rollers. Two of these rollers 70 and 71 rotate about vertical axes and are mounted on a body member or plate 72 rigidly supported on the body of the recorder. The spacing of the axes of the rollers 70 and 71 is such as to provide for an indication of a phase angle variation of three hundred and sixty electrical degrees upon movement of the pen 68 from one extreme of its range of movement to the other extreme of its range of movement. The endless band 69 is also supported on another larger pulley or roller 73, which is mounted so as to rotate about a vertical axis by being rigidly attached to a vertical shaft 74. The shaft 74 connects together the rotatable members of the two vertically arranged dynamo-electric machines or self synchronous motors 75 and 76. The endless band 69 is retained under tension by an idler pulley arrangement including a pulley 77 pivotally secured at 78 to a movable arm 79. The arm 79 is pivoted at 80 to the supporting member 72, and an arm 81 beneath the supporting member 72 is rigidly connected to the arm 79. The arm 81 is acted upon by a tension spring 82 attached at 83 to the supporting member 72. The idler pulley 77 is thus acted upon by the spring 82 with sufficient force to maintain the desired tension in the band 69. The necessary movement of the roller 77 is obtained by extending the pivotal support 78 through an elongated arcuate slot 84 in the plate 72. The particular manner of mounting the rollers or pulleys 70, 71, and 77 on their supports to provide for free rotation is shown in Fig. 10. A spindle 85 is threaded into the body of the supporting member 72. The spindle 85 is provided with a shoulder 86 secured in engagement with the supporting member 72, and the lower end of the roller 70 is received to receive the shoulder, and provide clearance between the bottom of the roller 70 and the supporting member 72. The roller 70 is removably secured to the spindle 85 by a round plate 87 secured to the top of the spindle 85 by a machine screw 88. The rollers 70 and 71 are secured to the supporting member 72 in the same manner, and the idler pulley or roller 77 is secured to the outer end of the arm 79 in a similar manner.

The endless band is preferably made of thin ribbon of steel joined together at the opposite ends, as shown in Fig. 8. The ends of the ribbon are cut off at an angle at 69a and rounded at 69b. One end is provided with a bayonet slot having a restricted portion 69c and an enlarged portion 69d. The ends are overlapped to cover the bayonet slot, and the other end has a pin 69e rigidly attached thereto. The pin 69e closely fits the restricted portion 69c of the bayonet slot, and is provided with an enlarged head tightly fitting against the side of the ribbon about the slot.

The styluses 68, 68a, 68b, and 68c are all of the same construction. Any suitable form of stylus may be employed to produce the curves 66 and 67 on the record sheet 31. I prefer, however, to utilize a pen type stylus having an ink well provided with a fine point extending in engagement with the record sheet. This construction is shown in Fig. 9. The pen 68 includes a cylindrical body extending vertically the width of the endless band 69. The body is provided with an ink well 68a open at the top for convenience in filling, and a sharp pointed stylus 68b having a passage 68c therein extending from the ink well 68a to the sharp point 68d of the stylus. The body of the ink well is attached to a flange 68e extending the width of the band 69, and is secured thereto by rivets 68f, it being understood that the flange portion 68e of the stylus may be secured to the band 69 in any other suitable manner.

The endless band 69 is retained in driving engagement with the pulley 73 mounted on the shaft of the dynamo-electric machine 76, by the spring-pressed idler pulley 77. The portion of the band 69 between rollers 70 and 71 also will be retained under tension. If the recorder is subjected to vibration the band 69 may vibrate and cause irregular marking on the record sheet 31, and also spilling ink from the well 68a. I suppress these undesirable vibrations by providing supports 72a and 72b arranged between the rollers 70 and 71, and 70 and 73 respectively. These supports have a rounded face engaging the band and extending the entire width thereof, and are secured at their lower ends by screws 72c and 72d respectively to the supporting member 72. The supporting member 72 is secured to the upper end-shield of the lower dynamo-electric machine 76 by suitable screws, and the dynamo-electric machines or self synchronous motors 75 and 76 are secured to the body of the recorder by bolts extending through the feet. The shafts of these dynamo-electric machines are arranged in vertical alignment, and connected together at 76a by a coupling provided with set screws, which rigidly attach the shafts of the machines together. The dynamo-electric machines or self synchronous motors 75 and 76 are normally maintained energized and produce torque in opposite directions, the torque of one machine being balanced to produce equilibrium with respect to the other one. An arrangement is provided for actuating one or the other of the machines, so that the angular movement of the machine corresponds to variations in phase relation, thus providing an angular measurement of the changes in phase. The dynamo-electric machines 75 and 76 constitute polyphase electrical elements in equilibrium.

In the particular construction illustrated, one complete rotation of the machines 75 and 76, in response to phase recorded variations, is equal to three hundred and sixty electrical degrees. The pulley 73, therefore, is made of such circumference that one rotation thereof by the dynamo-electric machines 75 and 76, in recording variations in phase, equals three hundred and sixty electrical degrees. This causes the pen 68 to traverse the entire distance between the rollers 70 and 71, the direction of movement of the pen 68 depending upon the direction of the shift of phase. The pen 68 is shown in zero degree phase position in Fig. 6 of the drawings. If the shift in phase is more than ninety degrees to the right as shown in Fig. 6, the pen 68 will pass over the roller 71 passing through the position shown in Fig. 7 of the drawings. When the pen 68 moves into this position shown in Fig. 7, the pen 68a moves into the position shown, so that for a phase shift in this direction of ninety degrees the pen 68 will record the variation. On the other hand if the pen 68 undergoes a phase variation indication greater than ninety degrees, it will move around the pulley 71 out of recording relation to the record sheet 31. However during this movement, the pen 68a will continue to indicate the recorded range of phase variation at the other side of the chart or record sheet. If the change in phase occurs in the other direction, then the pen 68a will move out of engagement with the record sheet 31, and the pen 68 will move into engagement therewith. The pens 68, 68a, 68b, and 68c, are all equally spaced apart, so that whatever range of movement may occur in the rotation of the pulley 73, at least one of the pens 68, 68a, 68b, or 68c, will be in recording relation to the record sheet 31. It will thus be seen that one of these pens records one range of recorded variation, whereas the other pen records another range of recorded variation. Since the record sheet 31 is driven in accordance with the range of movement of the material, or specimen 10, the record of variations in phase indicated by the curve 67, and the record indicated by the curve 66 of the variations in amplitude will remain in timed relation to each other, and in timed relation to the movement of the material to be tested.

In order to record the changes in phase in the secondary circuit associated with the secondary coil 16, I provide an amplifier for phase measurement 88, which receives energy through conductors 89 and the fifty cycle band pass filter 19 from the secondary circuit associated with the secondary coil 16. The energy received by the amplifier 88 is widely variable due to the changes caused by the specimen 10 in the electrical characteristics of the secondary circuit associated with the secondary coil 16. I, therefore, construct the amplifier 88 so that it has no variable phase distortion. Whatever phase changes occur in passing through the amplifier 88, the changes are constant without regard to the widely variable input from the band pass filter 19. The dynamo-electric machines 75 and 76 are thus actuated to give a true indication of phase, without effects of variable distortion. The stationary member of the dynamo-electric machine 75 is provided with a three phase distributed winding connected to a suitable alternating current source of supply by the terminals 92, and the dynamo-electric machine 76 is also provided with a three phase distributed winding connected to a suitable alternating current source of supply through the terminals 93. The rotatable members of the dynamo-electric machines 75 and 76 are mounted in suitable bearings, and each is provided with a concentrated two pole winding connected through suitable brushes to the conductors 90 and 91 respectively.

The torques produced by the rotatable members of the dynamo-electric machines 75 and 76 are opposed and equal, and as they are connected by the coupling 76a they are in equilibrium. The torque produced by each of these dynamo-electric machines is in two components. One component is due to the flux induced in the core of the rotatable member by the three phase rotating field. In some machines this component may be small, in others it may be large, due to the particular design. The other component of the torque is produced by the single phase current induced to flow in the concentrated two pole winding 120 or 122 of the rotatable members when these windings supply current to an external load. If the stationary members are excited from a three phase source of supply and the windings 120 or 122 of the rotatable members are connected to a load the rotatable members tend to operate as in a motor. The input to the winding of the rotatable member of the dynamo-electric machine 75 through the conductors 90 causes the same to assume a position due to the concentrated two pole winding, which is a direct measurement of the phase relation of the voltage and current supplied to the rotatable member through the conductors 90. This is caused by the rotating field of the stationary member acting upon the flux produced by the single phase excitation of the winding of the rotatable member to a position of zero current in the winding. For this reason, three hundred and sixty degrees of rotation of the dynamo-electric machine 75 under the action of the winding of the rotatable member is equal to three hundred and sixty electrical degrees. If the concentrated two pole windings of the rotatable members of the dynamo-electric machines 75 and 76 are made four pole, or any even multiple of two pole, the degree of rotation of the shafts 74 indicating three hundred and sixty electrical degrees will be something less than three hundred and sixty mechanical degrees, which is well understood in the art. If a greater number of poles were used the pulley 73 would be correspondingly changed in size, so that the pens 68, shown in Fig. 6 and in Fig. 7, would be actuated to move three hundred and sixty electrical degrees in accordance with three hundred and sixty electrical degrees of movement of the rotatable members of the dynamo-electric machines 75 and 76.

Under low, or zero, input the two pole concentrated winding of the rotatable member of the dynamo-electric machine 75 will be loaded by the amplifier 88, so that energy flows from the two pole winding to the amplifier. This tends to cause rotation of this dynamo-electric machine. Under this condition the machines are exactly balanced in equilibrium by supplying energy from the two pole concentrated winding of the rotatable member of the dynamo-electric machine 76 through the conductors 91. This particular mode of operation and construction will be more fully understood by reference to the diagrammatic illustration of Fig. 2 to be hereinafter more fully described.

As pointed out in discussing the construction of Fig. 1, the energy received by the amplifier for phase measurement 88 through conductors 89 and the fifty cycle band pass filter 19 from the secondary circuit associated with the coil 16 is of a very low magnitude, and widely variable, due to the variations produced by the characteristics of the specimen 10 in passing through the coils 14, 15, and 16. The amplifier 88 has such characteristics that the widely variable low power input thereto is highly amplified to give sufficient power to actuate the dynamo-electric machines 75 and 76, as required to record the variations in phase. This amplification is affected without any variable phase distortion between the voltage and the current from the input to the output of the amplifier 88. The output from the amplifier 88 is constant and whatever phase changes may occur within the amplifier 88 are constant throughout the range of low variable energy input thereto, so that the phase recorded by the curve 67 on the chart 31 is not affected by the widely varying character of the input to the amplifier 88.

The electron discharge circuit arrangements employed in the amplifier 88 are shown schematically in Fig. 2. The tubes employed in the circuit arrangements may be of any suitable electron discharge type. The cathodes may be either directly or indirectly heated in any suitable manner. The manner of heating the cathodes in the tubes illustrated in the drawings is not shown, in order to simplify the illustration in the drawings. The energy supplied to the amplifier 88 passes through several stages of amplification, the first stage being an amplifying tube 96. This amplifying tube 96 is resistance coupled to the succeeding amplifying tube by an arrangement including a plate circuit load resistor 97 connected to the plate 98 of the tube, a biasing resistor 99 being provided for the cathode 100 of the tube to control the voltage of the cathode within the desired range of variation. A by-pass condenser 99a is provided around the resistor 99 for the alternating current component of the plate circuit. The output from the tube 96 is resistance-coupled to the succeeding amplifying tube 101 through resistors 102 and 103, a blocking condenser 104 for the direct current plate voltage applied to the tube 96, a variable resistor 105, and a slider 106 to the grid 107 of the tube 101. The variable resistor 105 is provided for the purpose of controlling the amplification of the tubes 101 and the succeeding stages of amplification. The blocking condenser 104 provides for the free flow of the alternating current from the plate 98 of the amplifying tube 96 to the grid 107 of amplifying tube 101. The cathode 109 of the amplifying tube 101 is provided with a biasing resistor 108 to control the voltage of the cathode. This resistor 108 is by-passed by a condenser 110, so that the resistor will not interfere with the flow of alternating current in the plate circuit of amplifying tube 101. The amplified output of the tube 101 is supplied through a push-pull type amplifying arrangement including an iron core transformer 111 having its primary 111a connected to the plate 112 of the tube 101. The secondary 111b of this transformer 111 is connected to grids 112 of amplifying tubes 113, and the mid point of the secondary 111b is connected to —C battery. The cathodes of the tubes 113 are connected together at 115 and grounded at 116. The plates 117 of the tubes 113 are connected across the primary 118 of an iron core transformer 119, and the mid point of the primary 118 is connected to +B battery. The secondary of the transformer 119 is connected across a two pole concentrated winding 120 of the dynamo-electric machine 75 through conductors 90 and suitable brushes of the machine. The secondary of the transformer 119 is tapped to provide for matching the impedance of the plate circuit of the tubes 113. By this arrangement, the amplified output from the tube 101 through the transformer 111, tubes 113, and transformer 119 is supplied to the two pole concentrated winding 120 of the dynamo-electric machine 75.

The stationary member of the dynamo-electric machine or self synchronous motor 75 is provided with a three phase distributed winding connected to a fifty cycle alternating current source of supply 121, which is also connected to the three phase distributed winding of the stationary member of the dynamo-electric machine or self synchronous motor 76. The output from the transformer 119 excites the two pole concentrated winding 120 of the rotatable member of the dynamo-electric machine 75, and causes the rotatable member to move into a position angularly which is proportional to the angular phase relation between the voltage and the current in the circuit 90 supplying the alternating current to the winding 120. Under this condition, there is no energy output from the two pole concentrated winding of the rotatable member of the dynamo-electric machine 76, and the rotatable members of the dynamo-electric machines 75 and 76 are exerting opposing torque and in equilibrium throughout the range of angular movement required to record the variations in phase by movement of the shaft 74 and the pulley 73, which drives the endless band 69 of the recorder.

In order to obtain substantially constant power output for actuating the dynamo-electric machine 75 in recording phase, I provide an arrangement in the amplifying electron discharge circuits between the input 87 and the output 90 of the amplifier 88, which diverts energy from the amplifying circuit in direct proportion to the increase in energy, and conversely decreases the diversion of energy in the same proportion as the input decreases. This is done by providing an electron discharge circuit including two tubes 123 having their plates 124 connected at the opposite sides of the resistor 103, and their cathodes 125 grounded at 126 through a battery 127, the positive side thereof being connected to the cathodes. The number of tubes 123 may be varied as required to obtain the required load capacity and range of voltage variation. Under the conditions of low energy input the grids 126a of the tubes 123 are biased beyond cut-off by the battery 127, as the grids 126a are then at ground potential, so that no energy is diverted from the amplifying circuit through the tubes 123. Upon increase of input to the amplifier the grids 126a of the tubes 123 have their bias voltage raised in direct proportion to the increased input, so as to divert energy from the amplifying circuit through the tubes 123 by way of the plates 124 and cathodes 125. The voltage of the battery 127 is selected to cause the grids 126a of tubes 123 to begin diverting energy at X in the curves shown in Fig. 3. The tubes 123 thus serve as variable resistors to the flow of energy through the tubes by way of their plate circuits. The constant output at 90 from the amplifier 88 is indicated by the curve 90a in Fig. 3, and the energy diverted through the tubes 123 in proportion to the increased input to maintain constant output is indicated by the dotted curve 123a in Fig. 3.

The necessary control of the grids 126a to obtain this result is obtained by making a connection at 127a between the plate 98 of the amplifying tube 96 and the resistor 102, which is connected to ground through a blocking condenser 128a for blocking the plate voltage on the plate 98, and permitting the desired alternating current to pass therethrough, and through a resistor 128 having a slide 129 connected to the grid 130 of an amplifying tube 131. By making the connection at 127a the tendency for the increased input to overload the amplifying tube 131 is avoided, because the increased input is immediately diverted through the tubes 123. The slider 129 controls the amplification in the tube 131. The plate 132 of the tube 131 has a plate circuit load resistor 133 connected between the plate 132 and the +B battery. The output from the tube 131 is through a blocking condenser 134, to prevent the flow of B battery current through the succeeding tubes, but providing for the flow of the desired alternating current. The cathode 135 of the tube 131 is provided with a biasing resistor 136, which is provided with a by-pass condenser 137 connected across the same, so as not to interfere with the flow of alternating current in the plate circuit of the tube. The output from the amplifying tube 131 is to the plate 139 of a rectifying tube 138 having a plate loading resistor 140, which is grounded. The cathode 141 of the rectifying tube 138 is grounded through a biasing resistor 142, and a by-pass condenser 143 for alternating current or undesirable pulsations. The upper end of the biasing resistor 142 is positive and connected to the grids 126a of the tubes 123 through a resistor 144. This resistor or choke 144 must be made sufficiently large to prevent any feedback through the tubes 123 to the input of the amplifying tube 131, and also to suppress any undesirable ripples in the voltage on the grids 126a. Alternating current or pulsations are further carried from the grids 126a to ground through by-pass condenser 144a. Such ripples or pulsations would be reflected into the amplifying circuits and interfere with the smooth operation of the amplifier in the operation of the phase recorder. By this arrangement the energy derived from the output of the amplifying tube 96, through the amplifying tube 131, and the rectifying tube 138 controls the voltage on the grids 126a of the tubes 123, so as to divert energy from the amplifying circuit, as indicated by the dotted line 123a in Fig. 3, thus maintaining constant output from the amplifier 88.

In the amplifier 88 shown in Fig. 2, the resistors and the tubes may be selected to meet any particular requirements of design. However, if the values are chosen so that the resistors 102 and 103 each have one unit of resistance, the resistor 105 has five units of resistance, and the tubes 123 are biased beyond cut-off to provide infinite resistance, the output of the tube 96 is divided across seven units of resistance, the impedance of the condenser 104 being negligible as compared to the values of the resistors, then the input to tube 101 would be 5/7 of the output of tube 96.

At the maximum grid bias the direct current plate resistance of each of the tubes 123 was chosen, so that the alternating current output from the plate of the tube 96 was divided across the resistor 102 and the plate resistance of the tube 123 to give approximately 1/5 of the output of the tube 96 at the point 127a. The alternating current voltage at the plate of the second tube 123, or the input to the tube 101 was approximately 1/25 of the output of the tube 96. If a third tube 123 were added then the input to the tube 101 would be approximately 1/125 of the output of the tube 96. If a fourth tube were added then the input to the tube 101 would be approximately 1/625 of the output of the tube 96.

It will thus be seen that: two tubes 123 afford a voltage ratio of 5/7 to 1/25 or about 18 to 1; three tubes 123 afford a voltage ratio of 5/7 to 1/125 or about 89 to 1; and four tubes afford a voltage ratio of 5/7 to 1/625 or about 446 to 1. The number of tubes may be varied to obtain any desired variation.

I have obtained an even greater range of voltage variation by doubling the values of the resistors 102, 103, and 105. Under this condition when the tubes 123 are biased beyond cut-off to provide infinite resistance, the output of the tube 96 was divided across the resistors so that the input to the tube 101 was 5/7 of the output of the tube 96. At maximum bias of the tubes 123 the alternating current voltage was divided so that: the voltage at the plate of the first tube 123 was about 1/6 of the output of the tube 96; the voltage at the plate of the second tube 123 or the input to the tube 101 was 1/81 of the output of the tube 96; the voltage at the plate of a third tube 123, if added, would be about 1/729 of the output of tube 96; and the voltage at the plate of a fourth tube 123, if added, would be 1/6561 of the output of the tube 96. With this doubling of resistors 102, 103, and 105 the range of voltage variation afforded by the tubes 123 is as follows: two tubes about 58 to 1; three tubes about 520 to 1; and four tubes about 4685 to 1.

When the input to the amplifier 88 decreases to a small value, somewhere between O and X, as indicated in Fig. 3, the tubes 113 provide a load for the two pole concentrated winding 120 of the rotatable member of the dynamo-electric machine 75. As the stationary winding of the dynamo-electric machine 75 is of the three phase distributed type, this loading of the two pole concentrated winding 120 tends to cause the same to operate as a motor. In order to oppose the rotatable member of the dynamo-electric machine 75, to maintain the same in equilibrium under these conditions, the two pole concentrated winding 122 of the rotatable member of the dynamo-electric machine 76 is loaded by an amplifying and rectifying tube arrangement now to be described, so as to balance the torque exerted by the dynamo-electric machine 75. The two pole concentrated winding 122 of the dynamo-electric machine 76 is connected by conductors 91 and a variable resistor 91a across the secondary of the iron core transformer 145. The primary of this transformer is connected to plates 146 of amplifying tubes 147, the cathodes 148 of these tubes being connected together at 149 and grounded at 150. The mid point of the primary of transformer 145 is conected to +B battery. The grids 151 of the tubes 147 are connected together at 152, a by-pass condenser 153 being provided to by-pass to ground any undesirable pulsations or alternating current. Under this condition of zero or low input the tubes 147 load the two pole concentrated winding 122 of the dynamo-electric machine 76, so that the dynamo-electric machines 75 and 76 are opposed in torque and in equilibrium. The grids 151 of the tubes 147 are at zero bias, so that they do not interfere with the flow of current through the tubes. As soon as the power input to the amplifier 88 increases it is apparent that there will be a reversed flow of current in the output leads 90, so that energy will be supplied from the tubes 113 through the transformer 119 to the two pole concentrated winding 120 of the dynamo-electric machine 75. The grids 151 of the tubes 147 then must be immediately biased beyond cut-off, so as to cut off the flow of current in the plate circuit through the primary of the transformer 145. When this occurs the winding 122 of the dynamo-electric machine 76 is no longer loaded through the tubes 147.

This rapid response is obtained by making a connection at 154 in the plate circuit of the tube 123 and between the resistors 102 and 103. Thus the increased input causes a flow of energy through the conductor 155, and the blocking condenser 156 for the direct plate current of the tubes 123. The alternating current is impressed on the grid 157 of the amplifying tube 158 through a slider 159 of a variable resistor 160 connected between the condenser 156 and ground. The slider 159 provides for control of the amplification of the tube 158. The tube 158 is provided with a cathode 161, a biasing resistor 162, and a by-pass condenser 163 connected thereto. The output of the amplifying tube 158 is through a plate circuit loading resistor 164 connected to the plate 165 of the tube. The plate 165 of the tube 158 is connected to an output circuit through a blocking condenser 166 for the direct current plate voltage, but which passes the desired alternating current to the cathode 167 of a rectifying tube 168. The cathode 167 has a biasing resistor 169 connected between the cathode and ground. The plate 170 of the tube 168 is connected to an output circuit including a loading resistor 171 and a by-pass condenser 172 for by-passing any undesirable pulsations or alternating current. The output of the plate circuit of the rectifying tube 168 is connected to the grids 151 of the tubes 147 through a resistor 173. By this arrangement, as soon as the input to the amplifier 88 increases the energy is supplied through the conductor 155 to the amplifying tube 158 the rectifying tube 168, so as to immediately supply a voltage through the resistor 172 to the grids 151 and bias the tubes 147 beyond cut-off, thus immediately preventing any further loading of the two pole concentrated winding 122 of the dynamo-electric machine 76 by the tubes 147. Under this condition the dynamo-electric machine 75 will be actuated to assume an angular position depending upon the phase relation of the voltage and the current supplied from the transformer 119 through the conductors 90 to the two pole concentrated winding 120.

The characteristics of operation of this amplifier will be clear from a consideration of the curve shown in Fig. 3. At zero load the plate current of the tubes 147 is indicated by OW. During the incremental increase of initial input O to X, the plate current of the tubes 147 is reduced to zero, as indicated by the dotted curve 147a. During this interval the output of the amplifier is increased gradually as indicated by the line OY, and then becomes constant throughout the further range of increase as indicated at 88a by the line YZ. At the point X, it will be noted that the curve 123a is zero, but it increases in direct proportion to the input, which indicates that the energy diverted from the amplifier 88 through the tubes 123 keeps the output constant. It is to be understood, of course, that these curves represent the relation without taking into effect distortion, but this may be minimized by proper design.

The operation of the foregoing construction and the particular method employed in the operation of the system will be clear from the foregoing description, however, the entire operation now will be briefly described. The specimen 10 may be any suitable length of material the characteristics of which are to be determined. These characteristics may be determined by carrying out and recording the test of the specimen and then comparing the curves obtained in the recorder 24 with the known standard properties, or another specimen the properties of which have been previously determined by testing in the system. Preparatory to making the test, the specimen 10 is extended through the primary exciting coils 14 and 15 and the secondary coil 16, and a balancing wave of suitable magnitude is introduced into the secondary circuits 17 and 18 across the non-inductive resistor 44. In making the test, the specimen 10 is supported on the rollers 11 and 12 in coaxial relation with the exciting coils 14, 15, and the secondary coil 16, and the specimen is moved through the coils either manually, or by the driving arrangement indicated at 13, at a uniform speed suitable for the making of the test. The variations in the properties or characteristics of the specimen 10 affect the secondary coil 16 and the secondary circuits 17 and 18 associated therewith, and these effects are utilized to determine the characteristics of the specimen 10. A magnitude functionally related to an electrical characteristic of the secondary circuits 17 and 18 affected by the characteristics of the specimen 10 is recorded by supplying energy from the fifty cycle band pass filter 19 through conductors 20 to a voltage amplifier 21, and energy is supplied from the voltage amplifier 21 through conductors 22 to a stationary solenoid 23 of the recorder 24. Thus the armature 30 is acted upon by the solenoid 23, so as to actuate the arm 26 and cause the stylus 25 to make a record of amplitude on the record sheet 31 in coordinated or timed relation with the movement of the specimen, which operates the record sheet 31 through the roller 12 in contact with the specimen, flexible shaft 38, dynamo-electric machines 37 and 42 and the shaft 36. By this arrangement, the amplitude variation shown by the curve 66 is a record of a magnitude functionally related to the electrical characteristics of the secondary circuit 17 and 18 associated with the secondary coil 16, which is affected by the characteristics of the specimen 10 excited by the primary coils 14 and 15 from the alternating current source of supply 18.

As previously explained, unless the curve of magnitude 66 indicated on the record sheet 31 is related also to the phase relation of the voltage and the current in the secondary circuit 17 and 18 associated with the secondary coil 16, the observed results may be very misleading, because phase relation and magnitude must be coordinately taken into consideration to determine the properties of the specimen 10. Variations in phase are shown by the curve 67, which is traced on the moving chart 31 by pen or stylus 68, as clearly shown in Figs. 1, 4, and 6. The styluses 68, 68a, 68b, and 68c carried by the endless band 69 are controlled, so as to obtain the desired indication of variations in phase by the dynamo-electric machines or self synchronous motors 75 and 76, which are in opposed torque relation and in equilibrium throughout their range of movement. Under low input to the amplifier 88 the dynamo-electric machine 75 is loaded by the amplifier 88 through the conductors 90, so that it tends to operate as a motor. This is opposed and balanced to a condition of equilibrium by the action of the dynamo-electric machine 76, which is similarly loaded through the conductors 91 from the amplifier 88, as explained in connection with the description of the construction and operation of the amplifier 88 shown in Fig. 2. Beyond a low incremental input to the amplifier 88 the dynamo-electric machine 76 is no longer loaded by the amplifier 88 through the conductors 91. Under this condition the dynamo-electric machines 75 and 76 are producing opposed torque in equilibrium, and the dynamo-electric machine 75 is actuated to its angular position in accordance with variations in phase. This causes the pulley 73 to operate the band 69 and one or more of the styluses 68, 68a, 68b, or 68c trace the curve of phase variation as indicated at 67 in Figs. 1 and 5.

It will thus be seen that I have provided an improved system and method for testing materials in which the material is utilized to affect an electrical characteristic of an alternating current circuit, and the alternating current circuit variations produced by the characteristics of the specimen are recorded, as to magnitude and phase, in coordinated relation to each other and to the movement of the specimen 10.

I do not desire my invention to be limited to the particular construction and method described, and I intend in the appended claims to cover all modifications, which do not depart from the spirit and scope of my invention.

What I claim as new and desire to secure by Letters Patent of the United States, is:

1. A method of testing the properties of a material in which the material affects a phase relation and an electrical characteristic of an alternating current circuit including: indicating a magnitude functionally related to the phase angle between an alternating current and an alternating voltage in the circuit, and indicating a magnitude functionally related to an alternating electrical characteristic of the circuit simultaneously with and independently of indicating the magnitude related to the phase angle.

2. A method of testing the properties of a material in which the material affects a phase relation and an electrical characteristic of an alternating current circuit including: recording a magnitude functionally related to the phase angle between an alternating current and an alternating voltage in the circuit, and recording a magnitude functionally related to an electrical characteristic of the circuit simultaneously with and independently of the recording of the magnitude related to the phase angle with the amplitudes of the magnitudes arranged in timed relation.

3. A method of testing the properties of a material in which the material affects a phase relation and an electrical characteristic of an alternating current circuit and in which the material is moved with respect to the alternating current circuit including: indicating a magnitude functionally related to the phase angle between an alternating current in the circuit and an alternating voltage in the circuit, indicating a magnitude functionally related to an electrical characteristic of the circuit in timed relation to the magnitude relating to the phase angle, and indicating the phase angle and electrical characteristic in timed relation to the movement of the material.

4. A method of testing the properties of a material in which the material affects a phase relation and an electrical characteristic of an alternating current circuit and in which the material is moved with respect to the alternating current circuit including: indicating a magnitude functionally related to the phase angle between an alternating current and an alternating voltage in the circuit during the entire range of movement of the material, and indicating a magnitude functionally related to an electrical characteristic of the circuit simultaneously with the indication of the magnitude relating to the phase angle during the entire range of movement of the material.

5. A method of testing the properties of a material in which the material affects a phase relation and an electrical characteristic of an alternating current circuit and in which the material is moved with respect to the alternating current circuit including: recording a magnitude functionally related to the phase angle between an alternating current and an alternating voltage in the circuit during the entire range of movement of the material, recording a magnitude functionally related to an electrical characteristic of the circuit simultaneously with the recording of the magnitude related to the phase angle during the entire range of movement of the material, and recording the magnitudes related to the phase angle and the electrical characteristic in timed relation to each other and in timed relation to the movement of the material.

6. A method of testing the properties of a material in which the material affects a phase relation and an electrical characteristic of an alternating current circuit and in which the material is moved with respect to the alternating current circuit including: recording a magnitude functionally related to the phase angle between an alternating current and an alternating voltage in the circuit, recording a magnitude functionally related to an electrical characteristic of the circuit separately from the magnitude related to the phase of the alternating current, and timing the recording of the magnitudes relative to each other and relative to the movement of the material.

7. A method of testing the properties of a material in which the material is excited from an alternating current source and in which the excited material affects a phase relation and an electrical characteristic of an alternating current circuit including: exciting the material with an alternating current, electrically filtering all except a selected frequency supplied from the circuit, indicating an electrical characteristic supplied from the filter, and indicating the phase relation of the alternating electrical characteristic and the alternating current in the alternating current circuit.

8. A method of testing the properties of a material in which the material is excited from an alternating current source and in which the excited material affects a phase relation and an electrical characteristic of an alternating current circuit including: exciting the material from a pure sine wave alternating source, electrically filtering all except a selected frequency supplied from the circuit, indicating an electrical characteristic supplied from the filter, and indicating the phase relation of the electrical characteristic supplied from the filter and the alternating current in the alternating current exciting circuit.

9. A method of testing the properties of a material in which the material is excited from an alternating current source and in which the excited material affects a phase relation and an electrical characteristic of an alternating current circuit including: exciting the material with an alternating current, interposing a balancing wave in the circuit in opposition to an electrical characteristic in the circuit to provide a reference for measurement, electrically filtering all except a selected frequency from the circuit, indicating an alternating electrical characteristic supplied from the filter, and indicating the phase relation of voltage and current in the alternating current circuit.

10. A method of testing the properties of a material in which the material is excited from an alternating current source and in which the excited material affects a phase relation and an electrical characteristic of an alternating current circuit including: exciting the material from an alternating current source of supply, interposing a balancing wave of the same frequency as the source of supply in the circuit and in opposition to the voltage in the circuit to provide a reference for measurement, electrically filtering all frequencies higher than the frequency of the source of supply, recording an electrical characteristic supplied from the filter, and recording the phase relation of the voltage and the current in the alternating current circuit in timed relation to the recorded electrical characteristic.

11. A method of testing the properties of a material in which the material is excited from an alternating current source and in which the excited material affects a phase relation and an electrical characteristic of an alternating current circuit and in which the material is moved with respect to the alternating current circuit including: exciting the circuit with an alternating current, interposing a balancing wave in the circuit and in opposition to an electrical characteristic in the circuit to provide a reference for measurement, electrically filtering all except a selected range of frequency from the circuit, recording an electrical characteristic supplied from the filter, and recording the phase relation of the electrical characteristic supplied from the filter and the current in the alternating current circuit in timed relation to the electrical characteristic and in timed relation to the movement of the material.

12. An apparatus for testing the properties of a material including an alternating current circuit arranged in cooperative relation with said material, means for exciting said alternating current circuit, means for indicating an alternating electrical characteristic in said alternating current circuit, and means for indicating the phase relation between the voltage and the current in said alternating current circuit separate from said electrical characteristic indicating means and in timed relation to said alternating electrical characteristic.

13. An apparatus for testing the properties of a material including an alternating current circuit arranged in cooperative relation with said material, means for moving said material with respect to said alternating current circuit, means for exciting said alternating current circuit, means for indicating an alternating electrical characteristic in said alternating current circuit, and means for indicating the phase relation between the voltage and the current in said alternating current circuit separate from said voltage indicating means and in timed relation to said alternating electrical characteristic and to the movement of said material.

14. An apparatus for testing the properties of a material including an alternating current circuit, means for exciting said alternating current circuit from an alternating current source of supply, means utilizing said material for affecting the amplitude and phase of the electrical characteristics of said circuit in accordance with the characteristics of said material, means including an amplifier for indicating the change in amplitude of an electrical characteristic of said alternating current circuit, and means including an amplifier responsive to an electrical characteristic of said alternating current circuit and operating without variable phase distortion for indicating the phase relation between the voltage and current in said alternating current circuit.

15. An apparatus for testing the properties of a material including an alternating current circuit, means for exciting said alternating current circuit from an alternating current source of supply, means utilizing said material for affecting the amplitude and phase of the electrical characteristics of said circuit in accordance with the characteristics of said material, means including an amplifier for indicating the change in amplitude of an electrical characteristic of said alternating current circuit, and means including an amplifier responsive to an electrical characteristic of said alternating current circuit and operating without variable phase distortion for indicating the phase relation between the voltage and current in said alternating current circuit in timed relation to the indication of the change in amplitude of said electrical characteristic of said alternating current circuit.

16. An apparatus for testing the properties of a material including an alternating current circuit arranged in cooperative relation with the material, means for exciting said alternating current circuit from an alternating source of supply, means utilizing said material for affecting the amplitude phase angle and harmonic content of the electrical characteristics of said circuit in accordance with the characteristics of the material, means supplied from said alternating current circuit for electrically filtering all except a selected frequency, means for indicating the amplitude of the electrical characteristic corresponding to said selected frequency, and means including an amplifier actuated by the output from said filtering means and operating without variable phase distortion for indicating the phase relation between the selected frequency and the alternating current of the alternating current circuit.

17. An apparatus for testing the properties of a material including an alternating current circuit arranged in cooperative relation with said material, means including an amplifier for indicating the alternating voltage in said alternating current circuit, means including a filter for supplying a selected frequency of the voltage to said alternating voltage indicator, and means receiving energy from said alternating current circuit through said filter for indicating the phase relation of voltage from the filter and an electrical characteristic of said alternating current circuit.

18. An apparatus for testing the properties of a material including an alternating current circuit arranged in cooperative relation with said material, means including an amplifier for indicating an alternating electrical characteristic in said alternating current circuit, means including a filter for supplying from said alternating current circuit a selected frequency of an electrical characteristic to said electrical characteristic indicator, and means receiving widely varying energy from said alternating current circuit through said filter for indicating the phase relation of an electrical characteristic from said filter and an electrical characteristic of said alternating current circuit.

19. An apparatus for testing the properties of a material including an alternating current circuit arranged in cooperative relation with said material, means for indicating an alternating electrical characteristic in said alternating current circuit, means including a filter for supplying from said alternating current circuit a selected frequency of an electrical characteristic to said electrical characteristic indicator, and means receiving widely varying energy from said alternating current circuit through said filter and providing substantially constant relatively high energy output for indicating the phase relation of an electrical characteristic from said filter and an electrical characteristic of said alternating current circuit.

20. An apparatus for testing the properties of a material including an alternating current circuit arranged in cooperative relation with said material, said alternating current circuit providing low energy output widely variable in accordance with changes in the characteristics of said material, and means including a constant output amplifier receiving variable input from said alternating current circuit and maintaining constant phase over the range of low variable energy input for recording the phase relation of the voltage and the current in said alternating current circuit.

21. A method of testing the properties of a material in which the material is excited by an alternating current to produce an alternating flux therein, in which the condition or property of the material being tested is indicated in a circuit affected by the material, and in which the phase angle between the alternating voltage in the circuit affected by the material being tested may be any phase angle with respect to the alternating current producing the alternating flux dependent upon the property of the material including: automatically indicating a magnitude functionally related to the phase angle between the alternating current producing the alternating flux in the material being tested and an alternating voltage in the circuit affected by the material, and automatically indicating a magnitude functionally related to an alternating voltage of the circuit affected by the material simultaneously with and independently of indicating the magnitude related to the phase angle.

22. An apparatus for testing the properties of material in which the phase angle between the alternating voltage in the circuit affected by the material being tested and the alternating current producing the alternating flux is dependent upon the property of the material being tested including means exciting the material for producing therein an alternating flux, a circuit electrically affected by the material, means for automatically indicating a magnitude functionally related to the phase angle between the alternating current producing the alternating flux in the material and an alternating voltage in the circuit affected by the material, and means for automatically indicating a magnitude functionally related to an alternating voltage in the circuit affected by the material simultaneously with and independently of indicating the magnitude related to the phase angle.

23. A method of testing the properties of material in which the material is excited by an alternating current to produce therein an alternating flux, in which the condition or property of the material being tested is indicated in a circuit affected by the material, and in which the phase angle between the alternating voltage in the circuit affected by the material being tested may be any phase angle with respect to an alternating current of suitable reference depending upon the property of the material including:

providing an increment of voltage in the circuit affected by the material being tested, indicating a magnitude functionally related to the phase angle between the alternating current of reference and said increment of alternating voltage in the circuit affected by the material, and indicating a magnitude functionally related to the increment of alternating voltage in the circuit affected by the material simultaneously with and independently of indicating the magnitude related to the phase angle.

24. An apparatus for testing the properties of material in which the phase angle between an alternating voltage in the circuit affected by the material being tested and an alternating current of suitable reference is dependent upon the property of material being tested including means exciting the material for producing therein an alternating flux, a circuit electrically affected by the material, means associated with said circuit for providing an increment of an electrical characteristic indicative of a condition or property of the material being tested, means for indicating a magnitude functionally related to the phase angle between said alternating current of reference and said increment of alternating voltage in the circuit affected by the material, and means indicating the magnitude functionally related to said increment of alternating voltage in said circuit affected by said material simultaneously with and independently of indicating said magnitude related to the phase angle.

25. A method of testing the properties of material in which the material is excited by an alternating current to produce therein an alternating flux, and in which a plurality of the conditions or properties of the material being tested are indicated in a circuit by various electrical characteristic magnitudes and phase angles of the magnitudes with respect to a suitable reference corresponding with the particular condition or property of the material being determined by the electrical test including: indicating an electrical characteristic in the circuit affected by the material being tested, and indicating a magnitude functionally related to various phase angles between the alternating current of reference and the electrical characteristic in the circuit affected by the material corresponding to the particular properties of the material being determined in the electrical test.

EMMETT M. IRWIN.